(12) United States Patent
Mitchell

(10) Patent No.: US 10,288,892 B1
(45) Date of Patent: *May 14, 2019

(54) COMMON APERTURE OPTICAL RELAY SYSTEM

(71) Applicant: Wavefront Research, Inc., Bethlehem, PA (US)

(72) Inventor: Thomas A. Mitchell, Nazareth, PA (US)

(73) Assignee: WAVEFRONT RESEARCH, INC., Northampton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/784,455

(22) Filed: Oct. 16, 2017

Related U.S. Application Data

(63) Continuation of application No. 14/585,562, filed on Dec. 30, 2014, now Pat. No. 9,791,705.

(60) Provisional application No. 61/922,283, filed on Dec. 31, 2013.

(51) Int. Cl.
| | |
|---|---|
| *G02B 27/10* | (2006.01) |
| *G02B 13/14* | (2006.01) |
| *G02B 17/08* | (2006.01) |
| *G02B 5/28* | (2006.01) |
| *G02B 27/14* | (2006.01) |

(52) U.S. Cl.
CPC ........... *G02B 27/1066* (2013.01); *G02B 5/28* (2013.01); *G02B 13/14* (2013.01); *G02B 17/0896* (2013.01); *G02B 27/141* (2013.01); *G02B 27/149* (2013.01)

(58) Field of Classification Search
CPC ............ G02B 27/1006; G02B 27/1066; G02B 27/141; G02B 27/149; G02B 13/14; G02B 17/0896; G02B 21/18
USPC .................................. 359/374, 629, 634, 638
See application file for complete search history.

(56) References Cited

U.S. PATENT DOCUMENTS

| | | | |
|---|---|---|---|
| 3,510,575 | A | 5/1970 | Dillenburger et al. |
| 3,905,684 | A | 9/1975 | Cook et al. |
| 4,444,464 | A | 4/1984 | Minott |
| 4,728,965 | A | 3/1988 | Kessler et al. |
| 4,870,268 | A | 9/1989 | Vincent et al. |
| 5,262,895 | A | 11/1993 | LaDuke et al. |
| 5,305,146 | A | 4/1994 | Nakagaki et al. |
| 5,847,879 | A | 12/1998 | Cook |
| 6,975,400 | B2* | 12/2005 | Ortyn .................... C12Q 1/6816 250/458.1 |
| 7,411,734 | B2* | 8/2008 | Magarill ............ G02B 27/1026 348/338 |
| 7,628,494 | B2* | 12/2009 | Akiyama ............... H04N 9/315 348/757 |
| 8,496,335 | B2* | 7/2013 | Itoh ........................ G03B 21/14 353/81 |
| 9,395,055 | B2 | 7/2016 | Brukilacchio et al. |
| 9,400,419 | B2 | 7/2016 | Imai et al. |
| 9,429,761 | B2 | 8/2016 | Imai et al. |
| 9,568,737 | B1 | 2/2017 | Mitchell |
| 2004/0263989 | A1* | 12/2004 | Cobb ................... G02B 5/3058 359/634 |
| 2010/0321786 | A1 | 12/2010 | Rahn et al. |

(Continued)

*Primary Examiner* — Frank G Font
(74) *Attorney, Agent, or Firm* — Burns & Levinson LLP; Orlando Lopez

(57) ABSTRACT

An optical relay system that is capable of re-imaging an image or a pupil from a shared location to two or more optical systems, or from two or more optical systems to a shared location is disclosed.

12 Claims, 9 Drawing Sheets

(56) References Cited

U.S. PATENT DOCUMENTS

| | | | |
|---|---|---|---|
| 2014/0168614 A1* | 6/2014 | Matsubara | G02B 27/141 353/31 |
| 2014/0168785 A1* | 6/2014 | Belgum | G02B 21/06 359/634 |
| 2017/0212342 A1* | 7/2017 | Rozsa | G02B 21/0076 |

* cited by examiner

//COMMON APERTURE OPTICAL RELAY SYSTEM

CROSS REFERENCE TO RELATED APPLICATIONS

This application is a continuation of U.S. patent application Ser. No. 14/585,562, filed on Dec. 30, 2014, entitled COMMON APERTURE OPTICAL RELAY SYSTEM, which in turn claims priority to and benefit of U.S. Provisional Application No. 61/922,283, filed on Dec. 31, 2013, the contents of which are incorporated by reference herein in their entirety for all purposes.

STATEMENT OF FEDERALLY SPONSORED RESEARCH OR DEVELOPMENT

This invention was made with U.S. Government support from the U.S. Army under contract W15P7T-06-D-R401, subcontract R401-SC-20316-0252. The U.S. Government has certain rights in the invention.

BACKGROUND

These teachings relate generally to optical systems that can read image and imager pupil from a shared location to two or more optical systems.

In common aperture systems, it is often desirable to provide access to a shared optical component, pupil, imager, or system for two or more optical systems simultaneously. This can be difficult to achieve as a result of tradeoffs between the back focal distance requirements of the individual systems, obstructions due to optical or mechanical components, and other concerns.

SUMMARY

The embodiments of the present teachings provide the capability of re-imaging an image or a pupil from a shared location to two or more optical systems, or from two or more optical systems to a shared location.

More specifically, an embodiment of the common aperture optical relay system includes, but not limited to, a first source or object plane; a first optical system having at least one refractive or reflective element; said the first optical system being capable of substantially receiving a first portion of electromagnetic radiation emanating from the first source; a second source or object plane; a second optical system having at least one refractive or reflective element; the second optical system being capable of substantially receiving a second portion of electromagnetic radiation emanating from the second source; a beam splitter optically disposed to receive the first portion of the light from the first source and the second portion of the light from the second source; the beam splitter being capable of substantially transmitting the first portion of the light from the first optical system; the beam splitter being capable of substantially reflecting the second portion of the light from the second optical system; a third optical system having at least one refractive or reflective element; the third optical system being optically disposed to receive the first portion of the light and the second portion of the light from the beam splitter; the third optical sub-system being capable of substantially imaging the first portion of the light and the second portion of the light to substantially a same image plane.

For a better understanding of the present teachings, reference is made to the accompanying drawings and detailed description and its scope will be pointed out in the appended claims.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The following detailed description presents the currently contemplated modes of carrying out these teachings. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about."

A "source," as used herein, also refers to an object plane.

A "beam splitter," as used herein, refers to any component for separating electromagnetic radiation.

These teachings relate to an optical relay design that is capable of re-imaging an image or a pupil from a shared location to two or more optical systems, or from two or more optical systems to a shared location.

In common aperture systems, it is often desirable to provide access to a shared optical component, pupil, imager, or system for two or more optical systems simultaneously. This can be difficult to achieve as a result of tradeoffs between the back focal distance requirements of the individual systems, obstructions due to optical or mechanical components, and other concerns.

For example, consider some applications of imaging sensors in which it is desirable to have a common fore-optics for two distinct imaging systems, with two distinct calibration sources that need to be presented to this common aperture. The common aperture optical relay system of the embodiments of the disclosed teachings provides a compact method to provide multiple sources to a common aperture, as is described below.

Figure 1A:
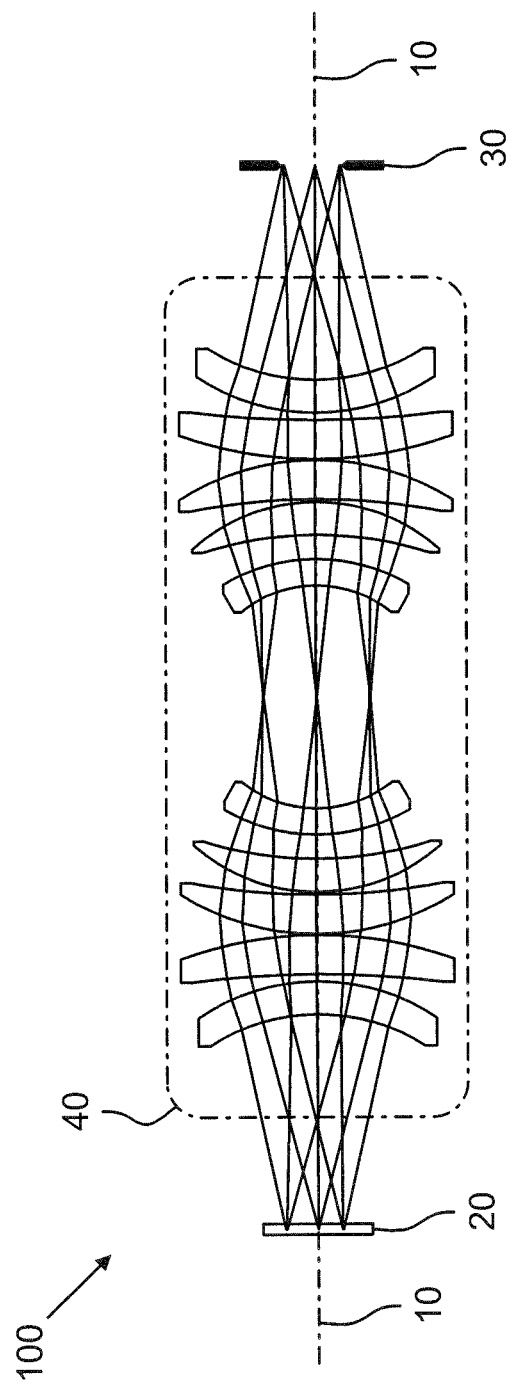
FIGS. 1A-1B are schematic views of optical relay imaging systems, taken along their respective optical axes.
Figure 1B:
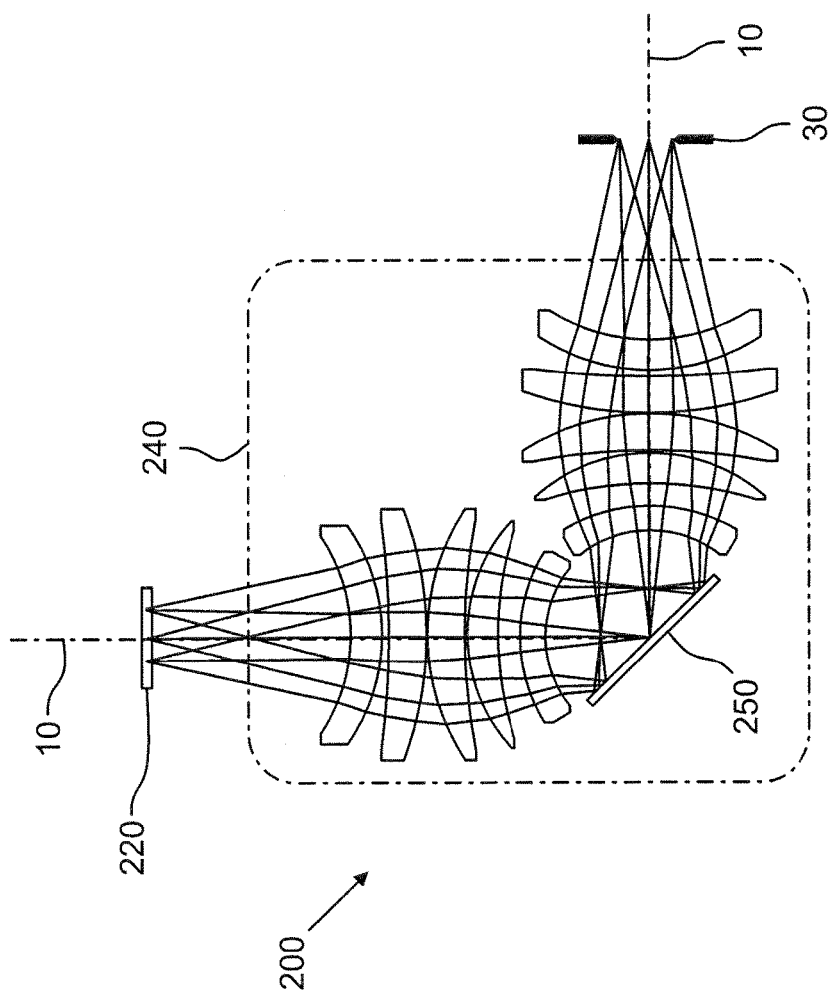

For clarity of the present teachings, reference is made to FIGS. 1A and 1B. FIG. 1A is a schematic view of a relay imaging system 100 taken along the optical axis 10. Electromagnetic radiation, typically in the ultraviolet, visible, and/or infrared bands, hereinafter referred to generally as light (which can be used synonymously with electromagnetic radiation through out), emitted or reflected by a given object, either real or virtual, hereinafter referred to generally as the source, located at the object plane 20 is re-imaged to the image plane, such as but not limited to the entrance pupil of another optical system, hereinafter referred to generally as the output 30, through an optical system 40 comprised of either refractive or reflective elements or combination thereof.

Reference is now made to FIG. 1B, which is a schematic view of another relay imaging system 200, taken along the optical axis 10. Light (as pointed out above may also be referred to as electromagnetic radiation) from a source located at the object plane 220 is re-imaged to the output 30, through an optical system 240 comprised of either refractive or reflective elements or combination thereof, in this embodiment including a fold mirror 250 within the optical system.

In many cases, such as but not limited to, common aperture multiband imaging systems, it is advantageous to provide calibration or other secondary sources to these optical systems, whereby more than one source is coupled to the optical systems through a shared common aperture. For example, a sensor may have a long-wave infrared sensor as well as a visible sensor that share a common aperture. It would be desirable to provide calibration sources to this common aperture, but each sensor may require a different type of calibration source. It is further desirable that this capability be easily implemented and not requiring the physical removal of one source to be replaced by another. The common aperture optical relays of the present teachings provide this capability in a compact design form. Also, for clarity, the same reference numerals will be used throughout the specification to designate substantially equivalent elements.

Figure 1C:
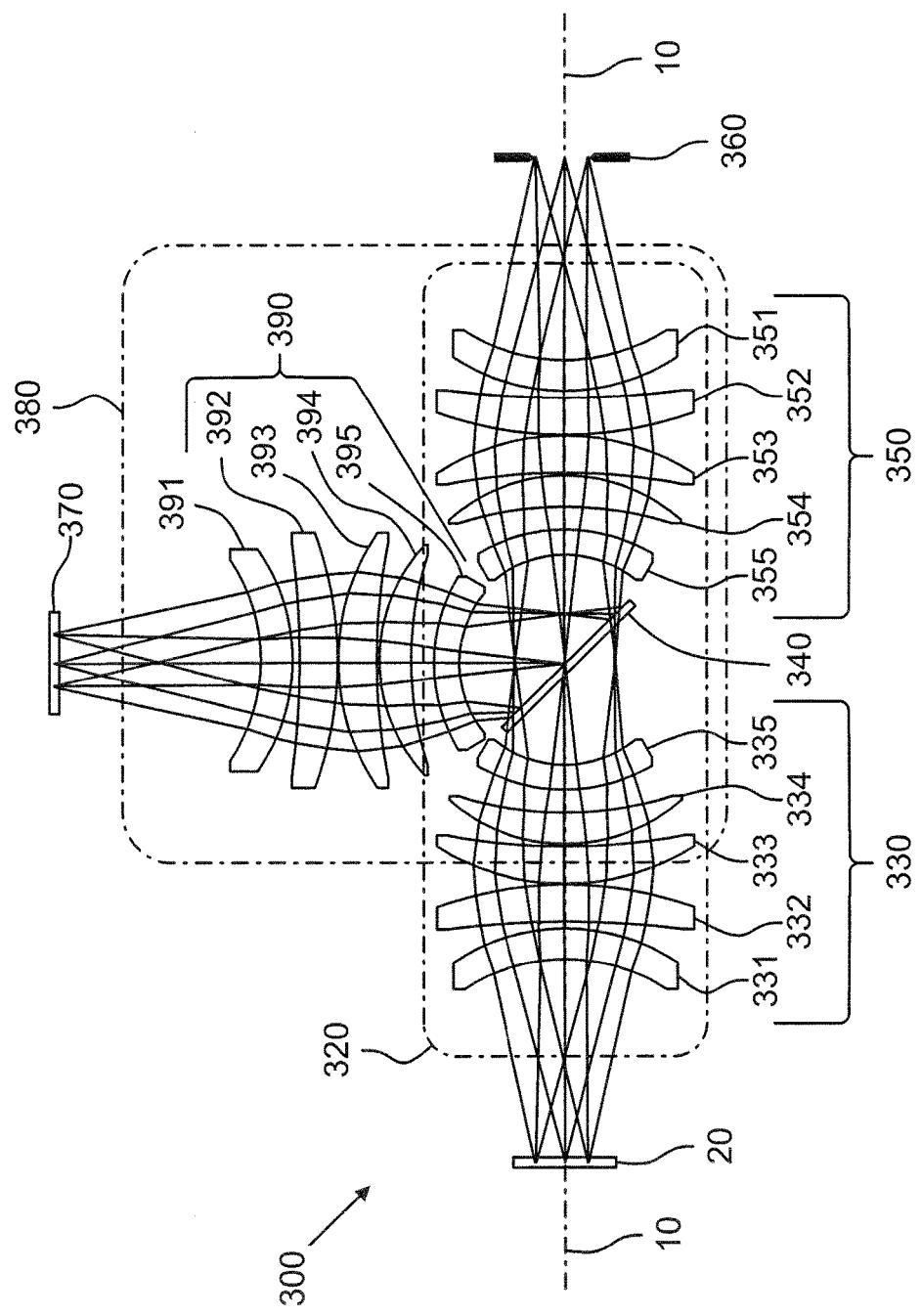
FIG. 1C is a schematic view of an embodiment of the present teachings, taken along its optical axis.

Reference is made to FIG. 1C, which is a schematic view of an embodiment of the present teachings 300, taken along the optical axis 10. Light from a first source or object plane 20 is incident on a first optical system 320 comprised of either refractive or reflective elements or combination thereof, that is capable of substantially receiving a first portion of the light from the first source 20 and partially imaged by a first portion 330 of the first optical system 320, in this embodiment made up of refractive elements 331, 332, 333, 334, and 335, onto a beam splitter 340, the preferred embodiment of which is a dichroic window, but in general is any method of separating light, hereinafter referred to generally as a beam splitter 340, which is capable of substantially transmitting the first portion of the light. This transmitted first portion of the light is then imaged by a second portion 350 of the first optical system 320, in this embodiment made up of refractive elements 351, 352, 353, 354, and 355, to the output 360, in this embodiment substantially coincident with the entrance pupil of a receiving optical system (not shown). Light from a second source or second object plane 370 is incident upon a second optical system 380 comprised of either refractive or reflective elements or combination thereof, that is capable of substantially receiving a second portion of the light from the second source 370 and partially imaged by a first portion 390 of the second optical system 380, in this embodiment made up of refractive elements 391, 392, 393, 394, and 395, onto the beam splitter 340 which is capable of substantially reflecting the second portion of the light. This reflected second portion of the light is then imaged by the second portion 350 of the first optical system 320 to substantially the same output 360 as the first portion of the light. The beam splitter 340 is a shared optical element in both the first optical system 320 and the second optical system 380, and both the first optical system 320 and the second optical system 380 substantially share the same the second portion 350 of the first optical system 320.

Although the optical fields of the embodiment illustrated in FIG. 1C are shown to be in the same plane as the sectional schematic view illustrated in FIG. 1C, these fields can also be in the plane orthogonal to the plane illustrated and are not limited in extent to that shown, and in fact any number of field geometries can be used and can be spatial or angular in design.

Figure 2:
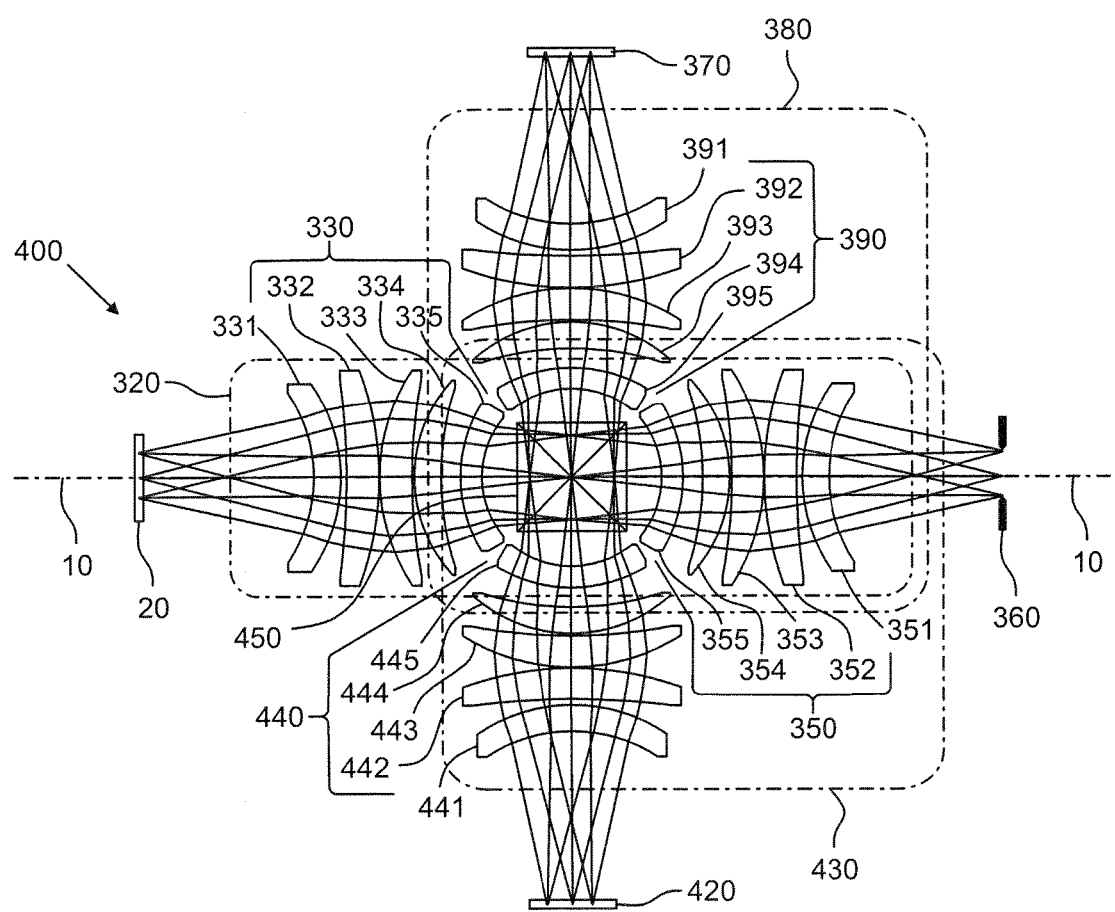
FIG. 2 is a schematic view of another embodiment of the present teachings, taken along its optical axis.

Reference is made to FIG. 2, which is a schematic view of another embodiment of the present teachings 400, taken along the optical axis 10. Light from a first source 20 is incident on a first optical system 320 comprised of either refractive or reflective elements or combination thereof, that is capable of substantially receiving a first portion of the light from the first source 20 and partially imaged by a first portion 330 of the first optical system 320, in this embodiment made up of refractive elements 331, 332, 333, 334, and 335, onto a beam splitter element 450, the preferred embodiment of which is a cube beam splitter, but in general is any method of separating light, which is capable of substantially transmitting the first portion of the light. This transmitted first portion of the light is then imaged by a second portion 350 of the first optical system 320, in this embodiment made up of refractive elements 351, 352, 353, 354, and 355, to the output 360, in this embodiment substantially coincident with the entrance pupil of a receiving optical system (not shown). Light from a second source 370 is incident upon a second optical system 380 comprised of either refractive or reflective elements or combination thereof, that is capable of substantially receiving a second portion of the light from the second source 370 and partially imaged by a first portion 390 of the second optical system 380, in this embodiment made up of refractive elements 391, 392, 393, 394, and 395, onto the beam splitter 450 which is capable of substantially reflecting the second portion of the light. This reflected second portion of the light is then imaged by the second portion 350 of the first optical system 320 to substantially the same output 360 as the first portion of the light. Light from a third source 420 is incident upon a second optical system 430 comprised of either refractive or reflective elements or combination thereof, that is capable of substantially receiving a second portion of the light from the second source 420 and partially imaged by a first portion 440 of the second optical system 430, in this embodiment made up of refractive elements 441, 442, 443, 444, and 445, onto the beam splitter 450 which is capable of substantially reflecting the second portion of the light. This reflected second portion of the light is then imaged by the second portion 350 of the first optical system 320 to substantially the same output 360 as the first and second portions of the light. The beam splitter element 450 is a shared optical element in the first optical system 320, the second optical system 380, and the third optical system 430, and the first optical system 320, the second optical system 380, and the third optical system 430 substantially share the same second portion 350 of the first optical system 320.

Figure 3A:
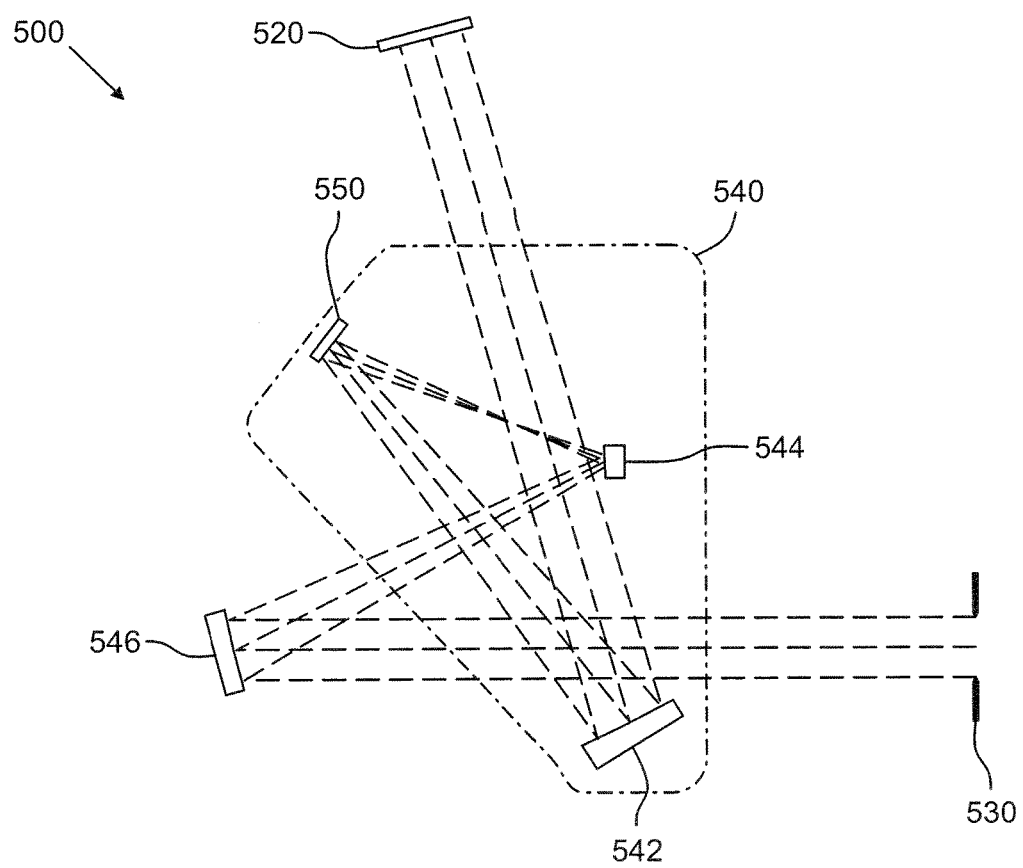
FIGS. 3A-3B are schematic views of optical relay imaging systems, taken along their respective optical axes.
Figure 3B:
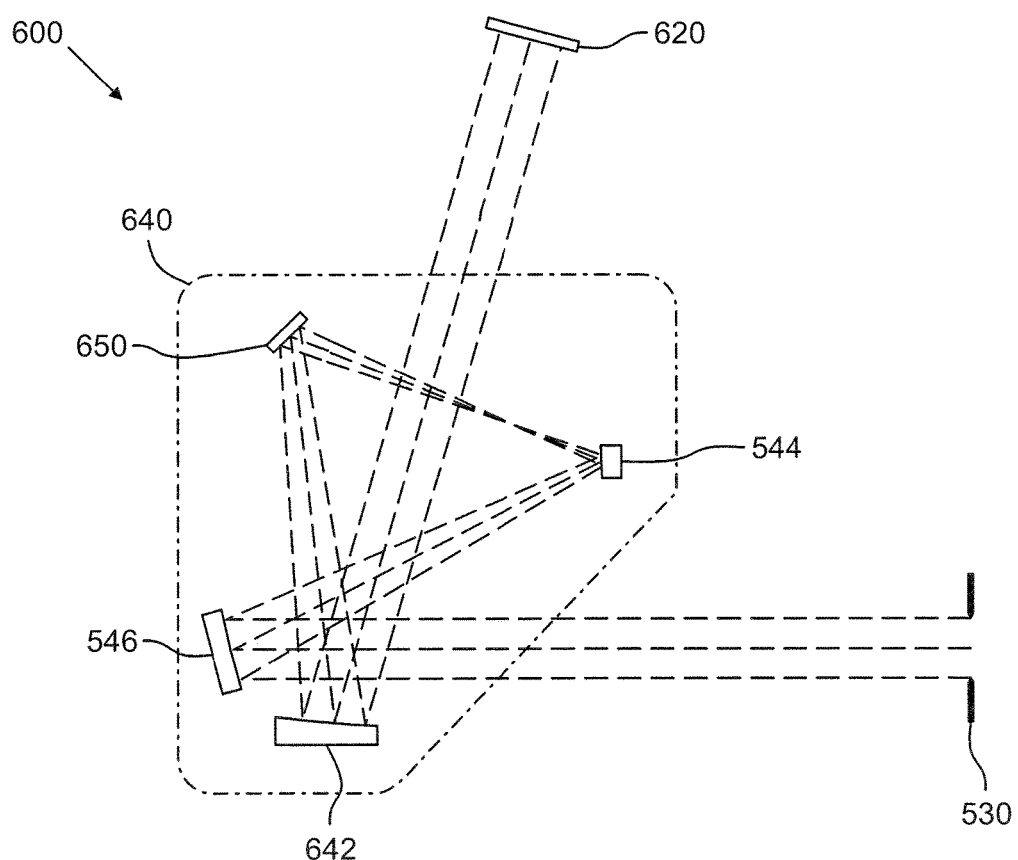

Again for clarity of understanding of the embodiments of the common aperture optical relay systems reference is made to FIGS. 3A and 3B. FIG. 3A is a schematic view of a relay imaging system 500, taken along its folded optical axis (not shown). Light from a source 520 is re-imaged to the output 530, such as but not limited to the entrance pupil of another optical system (not shown), through an optical system 540, comprised of either refractive or reflective elements or combination thereof, in this embodiment made up of three powered reflective elements 542, 544, and 546, and a fold mirror 550.

Reference is made to FIG. 3B, which is a schematic sectional view of a relay imaging system 600, taken along its folded optical axis (not shown). Light from a source 620 is re-imaged to the output 530, such as but not limited to the entrance pupil of another optical system, through an optical system 640, comprised of either refractive or reflective elements or combination thereof, in this embodiment made up of three powered reflective elements 642, 544, and 546, and a fold mirror 650.

Figure 3C:
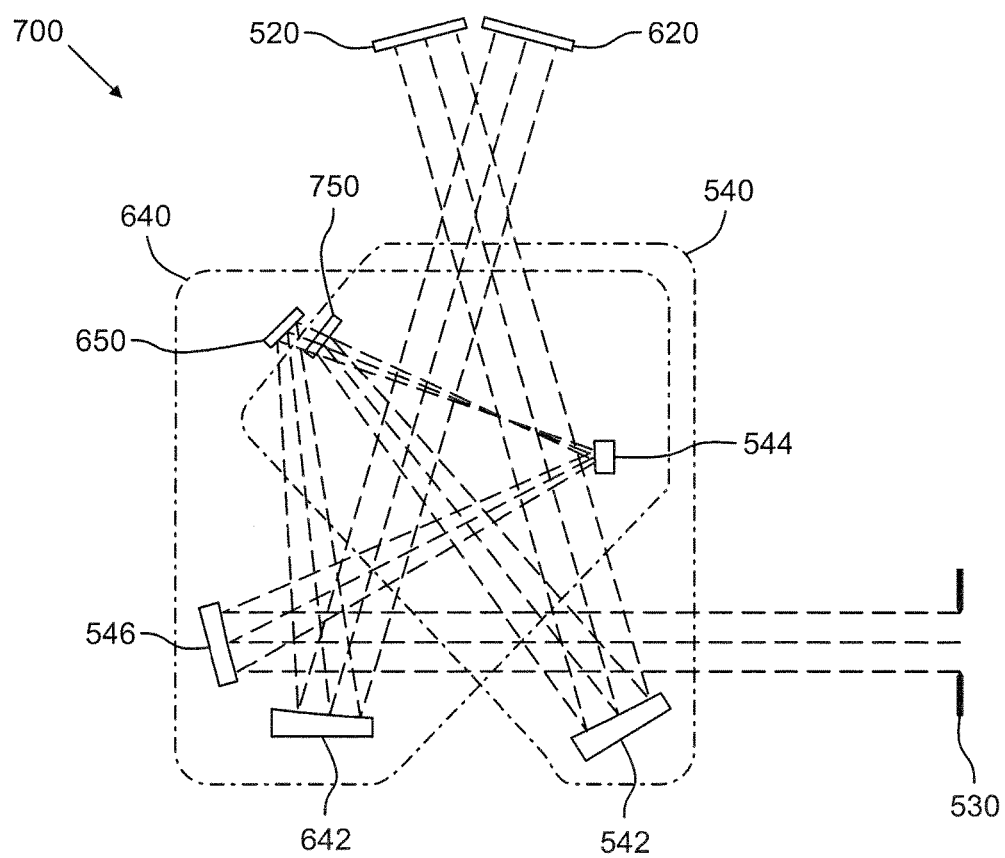
FIG. 3C is a schematic view of another embodiment of the present teachings, taken along its optical axis.

Reference is made to FIG. 3C, which is a schematic view of another embodiment of the present teachings 700, taken along its folded optical axis (not shown). Light from a first source 520 is incident on a first optical system 540, which is comprised of either refractive or reflective elements or combination thereof, in this embodiment made up of three powered reflective elements 542, 544, and 546, and a beam splitter 750, the preferred embodiment of which is, but not limited to, a dichroic window, but in general is any method of separating light, which is capable of substantially reflecting the first portion of the light. This first portion of the light is imaged by the first optical system 540, which is capable of substantially receiving the first portion of the light from the first source 520 that is reflected by the beam splitter 750, to the output 530, in this embodiment substantially coincident with the entrance pupil of a receiving optical system (not shown). Light from a second source 620 is incident upon a second optical system 640, which is comprised of either refractive or reflective elements or combination thereof, in this embodiment made up of three powered reflective elements 642, 544, and 546, a fold mirror 650, and the beam splitter element 750, which is capable of substantially transmitting the second portion of the light. This second portion of the light is imaged by the second optical system 640, which is capable of substantially receiving the second portion of the light from the second source 620 that is transmitted by the beam splitter 750, to substantially the same output 530 as the first portion of the light. The beam splitter 750 is a shared optical element in both the first optical system 540 and the second optical system 640, and both the first optical system 540 and the second optical system 640 substantially share a portion of the optical systems, in this embodiment made up of reflective elements 544 and 546.

Figure 4:
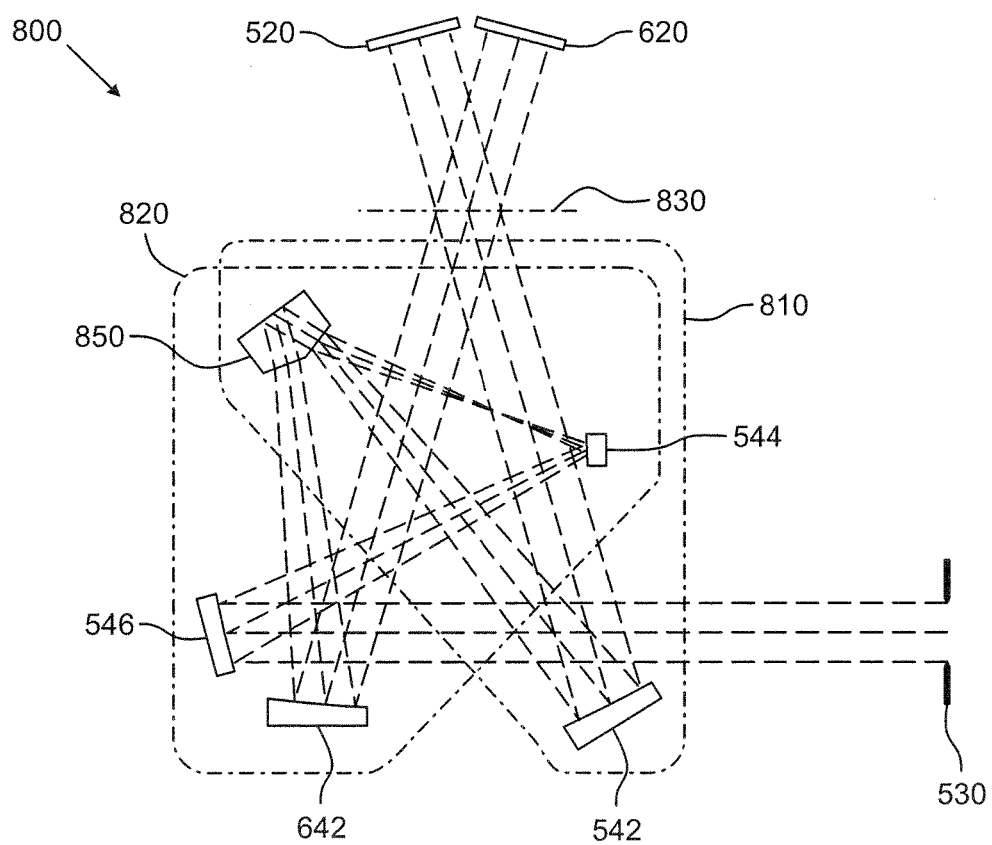
FIG. 4 is a schematic view of another embodiment of the present teachings, taken along its optical axis.

Reference is made to FIG. 4, which is a schematic view of another embodiment of the present teachings 800, in which the fold mirror 650 and beam splitter 750 of the embodiment of the present teachings 700 illustrated in FIG. 3C are combined into a beam splitter 850, in this embodiment made up of, but not limited to, a prism beam splitter. Light from a first source 520 is incident on a first optical system 810, which is comprised of either refractive or reflective elements or combination thereof, in this embodiment made up of three powered reflective elements 542, 544, and 546, and the beam splitter 850 which is capable of substantially reflecting the first portion of the light from source 520. This first portion of the light is imaged by the first optical system 810, which is capable of substantially receiving the first portion of the light from the first source 520 that is reflected by the beam splitter 850, to the output 530, in this embodiment substantially coincident with the entrance pupil of a receiving optical system (not shown). Light from a second source 620 is incident upon a second optical system 820, which is comprised of either refractive or reflective elements or combination thereof, in this embodiment made up of three powered reflective elements 642, 544, and 546, and the beam splitter 850, which is capable of substantially transmitting the second portion of the light. This second portion of the light is imaged by the second optical system 640, which is capable of substantially receiving the second portion of the light from the second source 620 that is transmitted by the beam splitter 850, to substantially the same output 530 as the first portion of the light. The beam splitter element 850 is a shared optical element in both the first optical system 810 and the second optical system 820, and both the first optical system 810 and the second optical system 820 substantially share a portion of the optical systems, in this embodiment made up of reflective elements 544 and 546.

In some cases, such as but not limited to, calibration optical systems, it is advantageous to provide a common location for which a filter, fold mirror, or other optical element can be inserted into the paths of the multiple sources simultaneously. The orientation of the beam splitter or fold mirror elements of the system can be positioned to provide such a common location in these teachings, as illustrated in the schematic sectional view of FIG. 4, where a substantially common overlap location 830 between the first source 520 and the second source 620 is shown. A spectral calibration filter or other optical element can be substantially positioned in this common overlap location to interact with light from both the sources simultaneously.

In some cases, such as but not limited to, common aperture multiband imaging systems, it is advantageous to direct the output of an optical system to multiple receiving optical systems. It is further desirable that this capability be easily implemented and not requiring the physical removal of receiving optical system to be replaced by another. The common aperture optical relays of the present teachings provide this capability in a compact design form.

Figure 5:
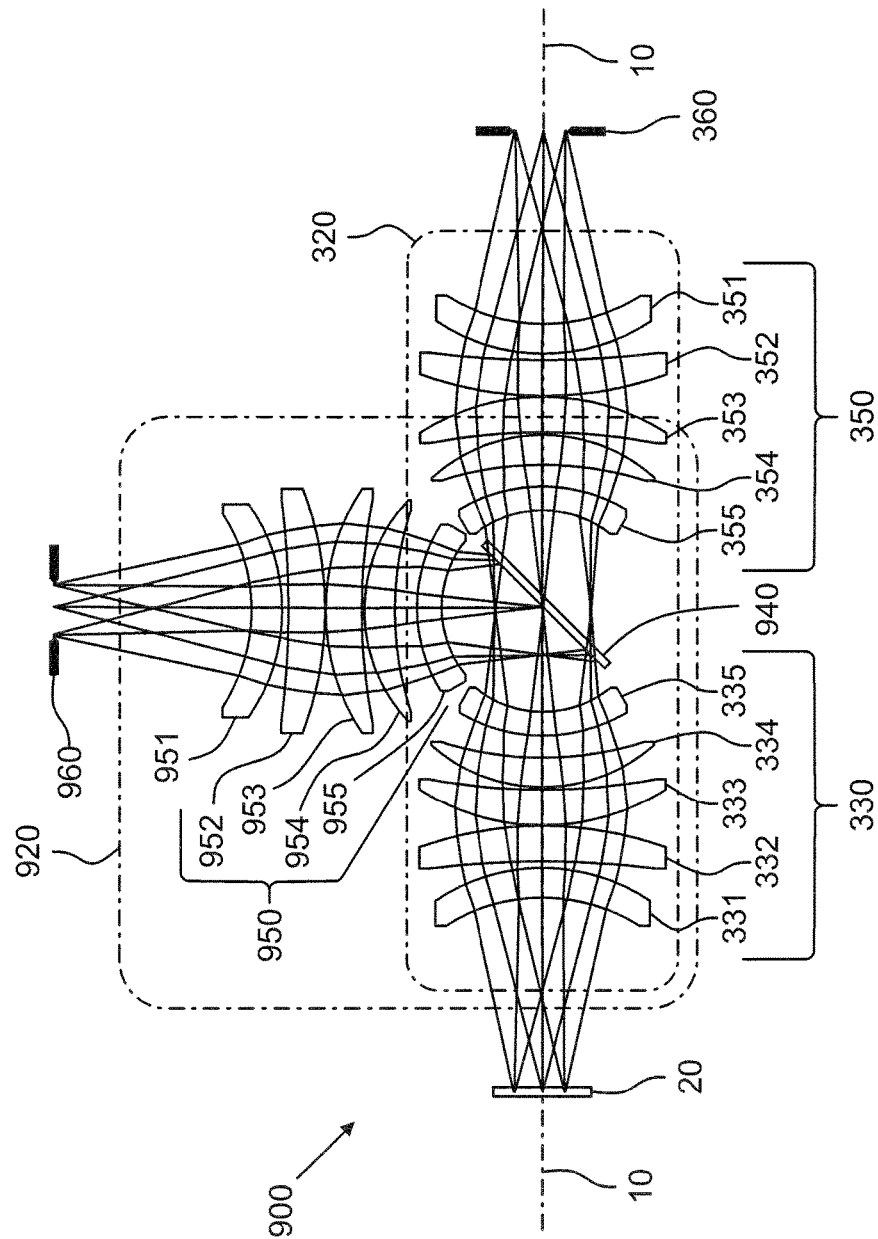
FIG. 5 is a schematic view of a further embodiment of the present teachings, taken along its optical axis.

Reference is made to FIG. 5, which is a schematic sectional view of another embodiment 900 of the present teachings, taken along the optical axis 10. Light from a first source 20 is incident on a first optical system 320 comprised of either refractive or reflective elements or combination thereof, that is capable of substantially receiving a first portion of the light from the first source 20 and partially imaged by a first portion 330 of the first optical system 320, in this embodiment made up of refractive elements 331, 332, 333, 334, and 335, onto a beam splitter element 340, the preferred embodiment of which is a dichroic window, but in general is any method of separating light, hereinafter referred to generally as a beam splitter element, which is capable of substantially transmitting a first portion of the light and reflecting a second portion of the light. The transmitted first portion of the light is imaged by a second portion 350 of the first optical system 320, in this embodiment made up of refractive elements 351, 352, 353, 354, and 355, to the output 360, in this embodiment substantially coincident with the entrance pupil of a first receiving optical system. The reflected second portion of the light is imaged by a second portion 950 of a second optical system 920, in this embodiment made up of refractive elements 951, 952, 953, 954, and 955, to the output 960, in this embodiment substantially coincident with the entrance pupil of a second receiving optical system. The beam splitter element 940 is a shared optical element in both the first optical system 320 and the second optical system 920, and both the first optical system 320 and the second optical system 920 substantially share the same the first portion 330 of the first optical system 320.

Any number of sources and optical systems can be used in the embodiments of the present teachings. The beam splitting component can be separated by any number of methods, such as, but not limited to, wavelength and polarization, and can be comprised of a dichroic filter, cube beam splitter, or any other means by which light can be separated. Although the magnification of the optical systems described in the embodiments of the present teachings are typically near unity, they are not limited to this value and can have any desired magnification.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although these teachings have been described with respect to various embodiments, it should be realized these teachings are also capable of a wide variety of further and other embodiments within the spirit and scope of the appended claims.

The invention claimed is:

1. An optical imaging system comprising:
a first optical system having at least one refractive or reflective element; the first optical system configured to substantially receive a first portion of electromagnetic radiation emanating from a first source; the first optical system having optical power;
a second optical system having at least one refractive or reflective element; the second optical system configured to substantially receive a second portion of electromagnetic radiation emanating from a second source; the second optical system having optical power; the first source and the second source being physically located in substantially separate locations;
a beam splitter optically disposed to receive the first portion of the electromagnetic radiation from the first source and the second portion of the electromagnetic radiation from the second source; the beam splitter being configured to substantially receive the first portion of the electromagnetic radiation from the first optical system; the beam splitter being also configured to substantially receive the second portion of the electromagnetic radiation from the second optical system; an optical element from the first optical system first receiving electromagnetic radiation from the first source and another optical element from the second optical system first receiving electromagnetic radiation from the second source not being a same optical element; and
a third optical system having at least one refractive or reflective element; the third optical system being optically disposed to receive at least some of the first portion of the electromagnetic radiation and at least some of the second portion of the electromagnetic radiation from the beam splitter; and
a fourth optical system having an entrance pupil;
the third optical system being capable of substantially imaging the first portion of the electromagnetic radiation and the second portion of the electromagnetic radiation to the entrance pupil of the fourth optical system; the entrance pupil of the fourth optical system being optically disposed to receive the first portion of the electromagnetic radiation and the second portion of the electromagnetic radiation from the third optical system.

2. The optical imaging system of claim 1 wherein the beam splitter comprises a dichroic window.

3. An optical imaging system comprising:
a first optical system having at least one refractive or reflective element; the first optical system configured to substantially receive a first portion of electromagnetic radiation emanating from a first source; the first optical system having optical power;
a second optical system having at least one refractive or reflective element; the second optical system configured to substantially receive a second portion of electromagnetic radiation emanating from a second source; the second optical system having optical power;
a third optical system having at least one refractive or reflective element; the third optical system configured to substantially receive a third portion of electromagnetic radiation emanating from a third source; the third optical system having optical power; the first source and the second source and the third source all being physically located in substantially separate locations; an optical element first receiving electromagnetic radiation from the first source, another optical element first receiving electromagnetic radiation from the second source and yet another optical element first receiving electromagnetic radiation from the third source not being a same optical element;
a beam splitter optically disposed to receive the first portion of the electromagnetic radiation from the first source, the second portion of the electromagnetic radiation from the second source, and the third portion of the electromagnetic radiation from the third source; the beam splitter being configured to substantially receive the first portion of the electromagnetic radiation from the first optical system; the beam splitter also configured to substantially receive the second portion of the electromagnetic radiation from the second optical system; the beam splitter being also configured to substantially receive the third portion of the electromagnetic radiation from the third optical system;
a fourth optical system having at least one refractive or reflective element; the fourth optical system being optically disposed to receive at least some of the first portion of the electromagnetic radiation, at least some of the second portion of the electromagnetic radiation, and at least some of the third portion of the electromagnetic radiation from the beam splitter;
a fifth optical system having an entrance pupil; and
the fourth optical system configured to substantially image the first portion of the electromagnetic radiation, the second portion of the electromagnetic radiation, and the third portion of the electromagnetic radiation to the entrance pupil of the fifth optical system; the entrance pupil of the fifth optical system being optically disposed to receive the first portion of the electromagnetic radiation, the second portion of the electromagnetic radiation, and the third portion of the electromagnetic radiation from the fourth optical system.

4. The optical imaging system of claim 3 wherein the beam splitter comprises a cube beam splitter.

5. An optical imaging system comprising:

a first optical system having at least one refractive or reflective element; the first optical system configured to substantially receive a first portion of electromagnetic radiation emanating from a first source; the first optical system configured to substantially image the first portion of the electromagnetic radiation to an image plane;

a second optical system having at least one refractive or reflective element; the second optical system configured to substantially receive a second portion of electromagnetic radiation emanating from a second source; the second optical system configured to substantially image the second portion of the electromagnetic radiation to the image plane; the first source and the second source being physically located in substantially separate locations; the first optical system receiving the first portion of electromagnetic radiation emanating from the first source at a first location and the second optical system receiving, at a second location, the second portion of electromagnetic radiation emanating from the second source; the first location being different from the second location; the image plane being optically disposed to receive the first portion of the electromagnetic radiation from the first optical system and the second portion of the electromagnetic radiation from the second optical system; an optical element first receiving electromagnetic radiation from the first source and another optical element first receiving electromagnetic radiation from the second source not being a same optical element;

a beam splitter optically disposed to receive the first portion of the electromagnetic radiation from the first source and the second portion of the electromagnetic radiation from the second source; the beam splitter being configured to substantially receive the first portion of the electromagnetic radiation from the first optical system; the beam splitter being also configured to substantially receive the second portion of the electromagnetic radiation from the second optical system; and a third optical system having an entrance pupil; the entrance pupil of the third optical system being physically located substantially at the image plane of the first and second optical systems.

6. The optical imaging system of claim 5, wherein the first optical source is a lamp and the second optical source is a blackbody.

7. The optical imaging system of claim 5, wherein the beam splitter is an optical window comprising an optical filter.

8. The optical imaging system of claim 5, wherein the beam splitter is a prism element comprising an optical filter.

9. The optical imaging system of claim 8, wherein the first optical system and the second optical system share a common said at least one refractive or reflective element.

10. The optical imaging system of claim 9, wherein the image plane is substantially located at an entrance pupil of a receiving optical system.

11. The optical imaging system of claim 10, wherein the first portion of electromagnetic radiation emanating from the first source and the second portion of electromagnetic radiation emanating from the second source substantially overlap at an overlap location.

12. The optical imaging system of claim 11, wherein an optical filter is substantially located at the overlap location.

* * * * *